March 1, 1938. O. E. CURTIS 2,109,769
AUTOMATIC CONTROL FOR DISK HARROWS
Filed Feb. 10, 1937 4 Sheets-Sheet 1
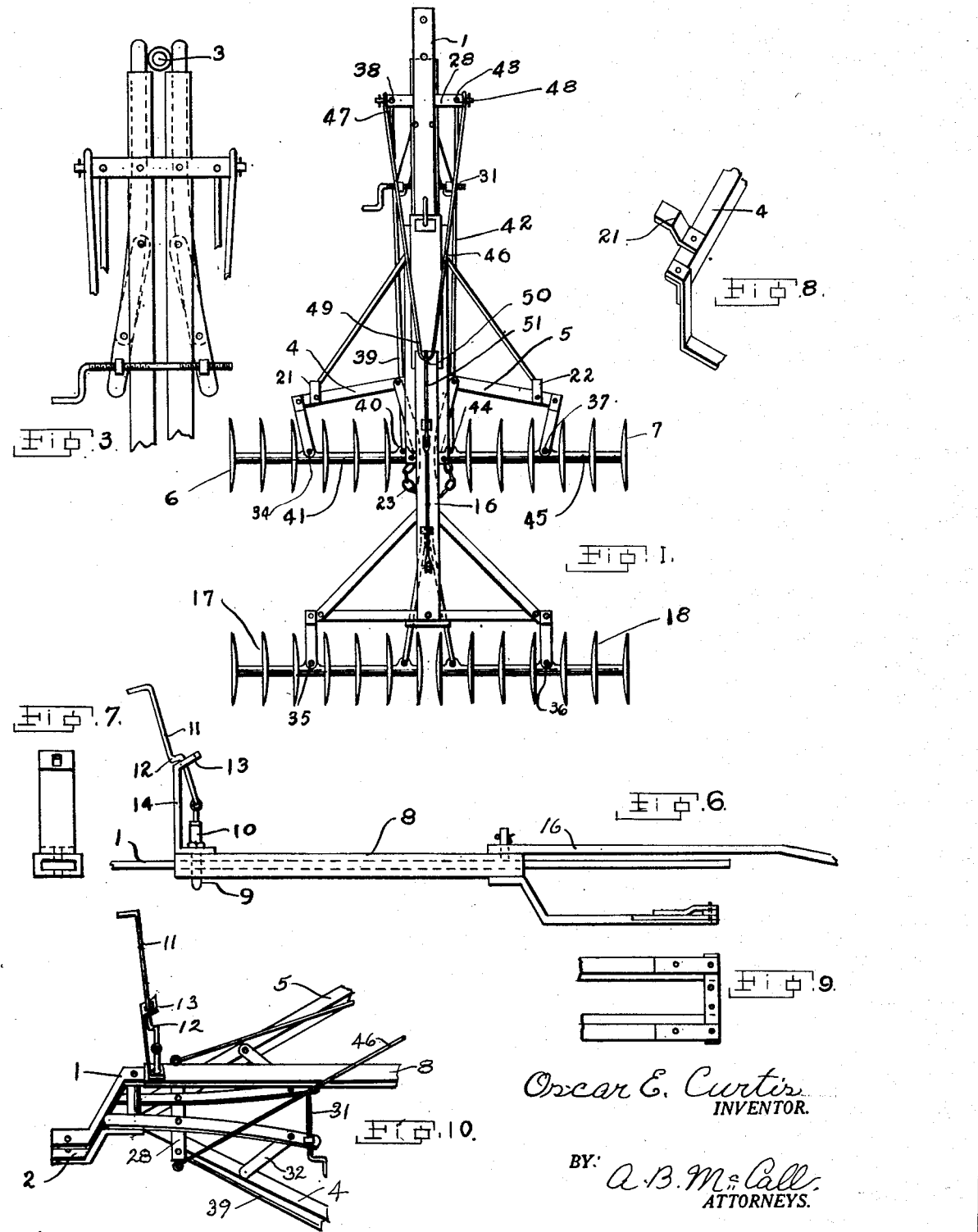

March 1, 1938. O. E. CURTIS 2,109,769
AUTOMATIC CONTROL FOR DISK HARROWS
Filed Feb. 10, 1937 4 Sheets-Sheet 2
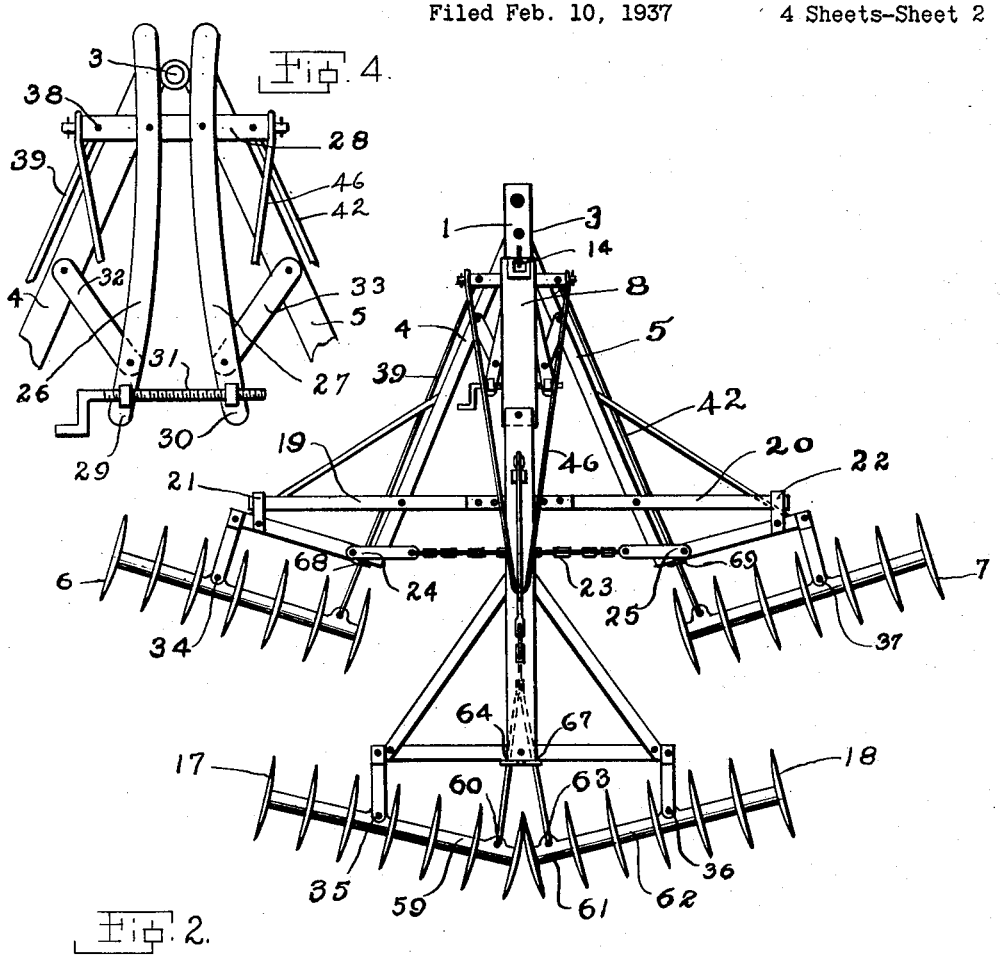
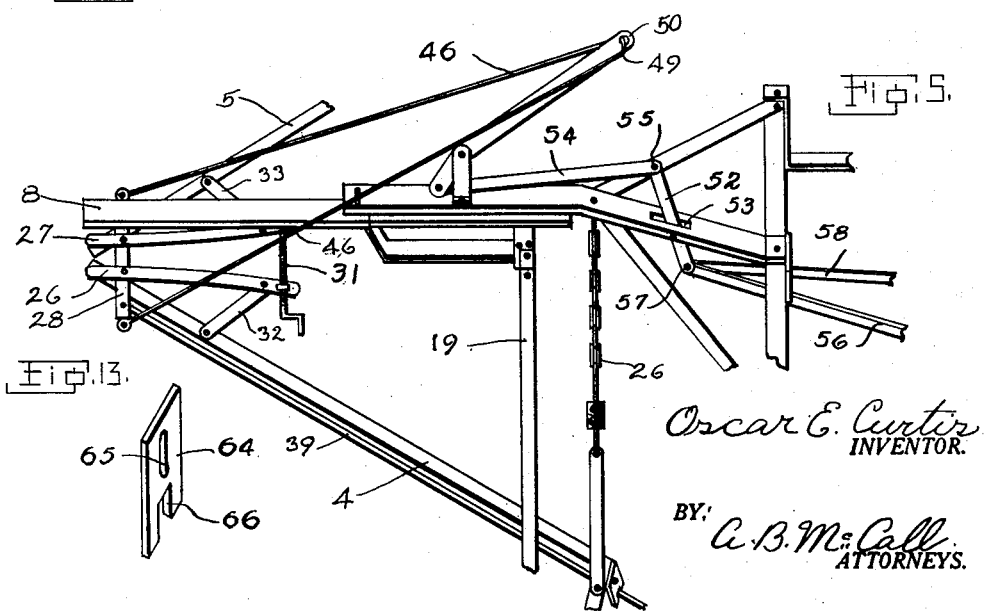

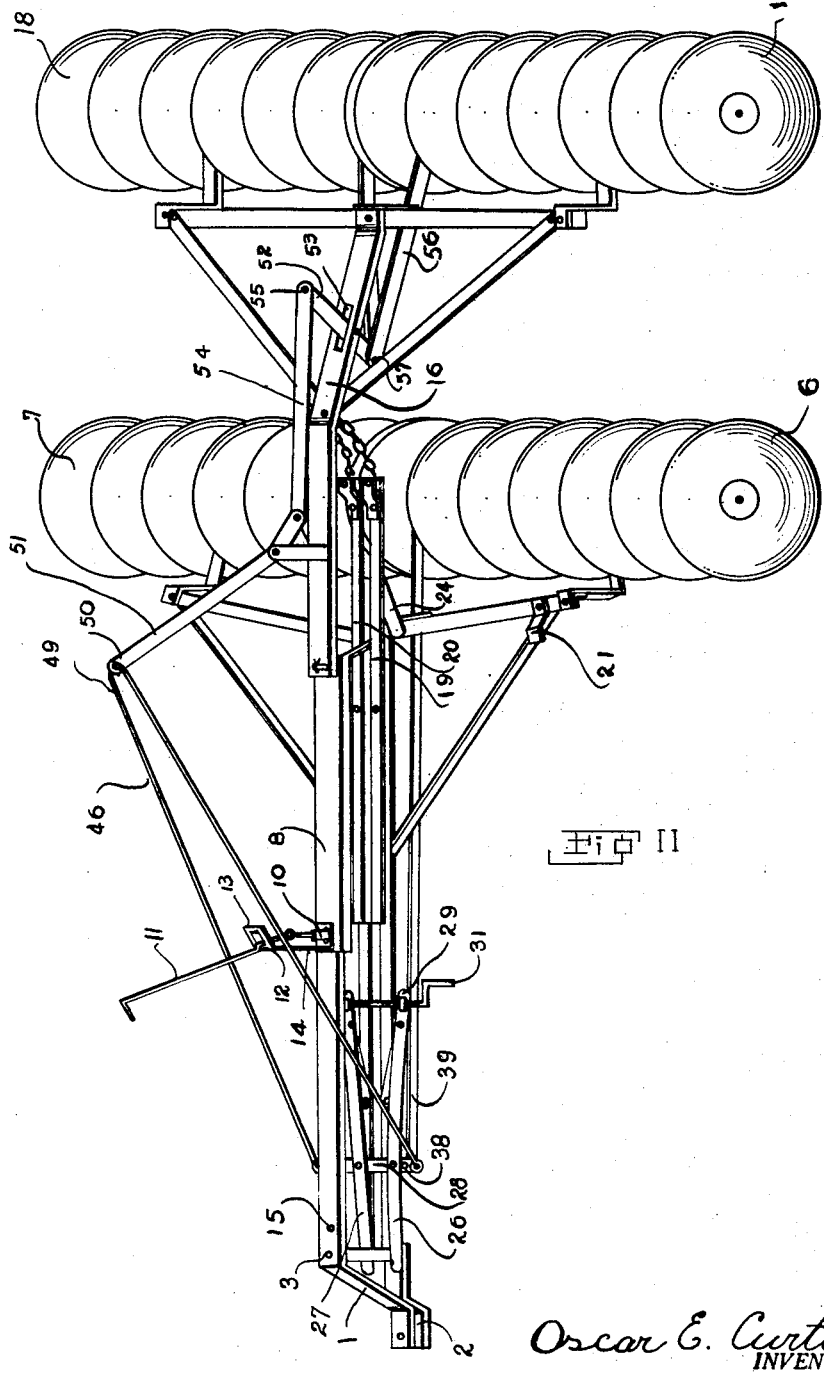

March 1, 1938.     O. E. CURTIS     2,109,769
AUTOMATIC CONTROL FOR DISK HARROWS
Filed Feb. 10, 1937     4 Sheets-Sheet 4

Oscar E. Curtis
INVENTOR.

BY: A. B. McCall
ATTORNEYS.

Patented Mar. 1, 1938

2,109,769

UNITED STATES PATENT OFFICE 2,109,769

AUTOMATIC CONTROL FOR DISK HARROWS

Oscar E. Curtis, Mount Pulaski, Ill.

Application February 10, 1937, Serial No. 124,996

14 Claims. (Cl. 55—83)

My invention relates to soil agitating implements and has for an object to provide a very practical and effective automatic means by which the implement may be operated when in use as well as a novel and simple method of adjusting the same when it may be desired to pull the implement through a fence opening or gate to reduce the width thereof to get it through such an opening.

This application is to protect certain novel improvements which I have developed on a disk gang harrow for which I have filed application for United States patent bearing Serial No. 85,876, which has become Patent Numbered 2,094,144 of Sept. 28, 1937.

My purposes of this invention are to provide certain novel adjustment mechanisms by which a selected operating position for the agitator or disk gang members may be set before the implement is started out in the field, if desired.

In fact, after making such adjustments in this novel mechanism before starting out in the field work, then the results of the adjustments made will operate to effectively provide what may well be regarded as an automatic control of the pivotal position of the agitator or disk gang members in the depth cutting positions thereof.

A further purpose of my improvements in this implement is to provide these desired control facilities with less parts and less cost of production than would be possible without it.

I attain the objects of my invention by the improvements described in the annexed specification, recited in the claims and illustrated in the accompanying drawings wherein like reference numerals indicate like parts in the several figures.

Referring to the figures:

Fig. 1 is a top view of my disk harrow shown in its contracted position.

Fig. 2 is a top view of the disk harrow shown in Fig. 1 and in position for operation in the field.

Fig. 3 is a top view of a detail of my automatic control mechanism.

Fig. 4 is a top view of the detail shown in Fig. 3 but illustrating the automatic control mechanism in spreading position.

Fig. 5 is a perspective illustrating details of the mechanical connections for my automatic control.

Fig. 6 is a detail of a side view of a portion of the central frame structure and the detachable holding means for the slidable supporting sleeve therefor.

Fig. 7 is an end view of the sliding sleeve with the upright bracket for supporting the handle which controls the anchoring pin for the sleeve.

Fig. 8 is a detail showing the operating position of the stop member brackets and the disk gang holding brackets as they fit on that portion of the frame supporting the same.

Fig. 9 is a top view of an under-slung portion of the frame which is adapted to operatively support the pivoted brace arms reaching out to the side wings of the frame.

Fig. 10 is a detail of the control mechanism shown in perspective.

Fig. 11 is a perspective of my implement shown in contracted position.

Fig. 13 is a detail view of a guide member.

Figure 12:
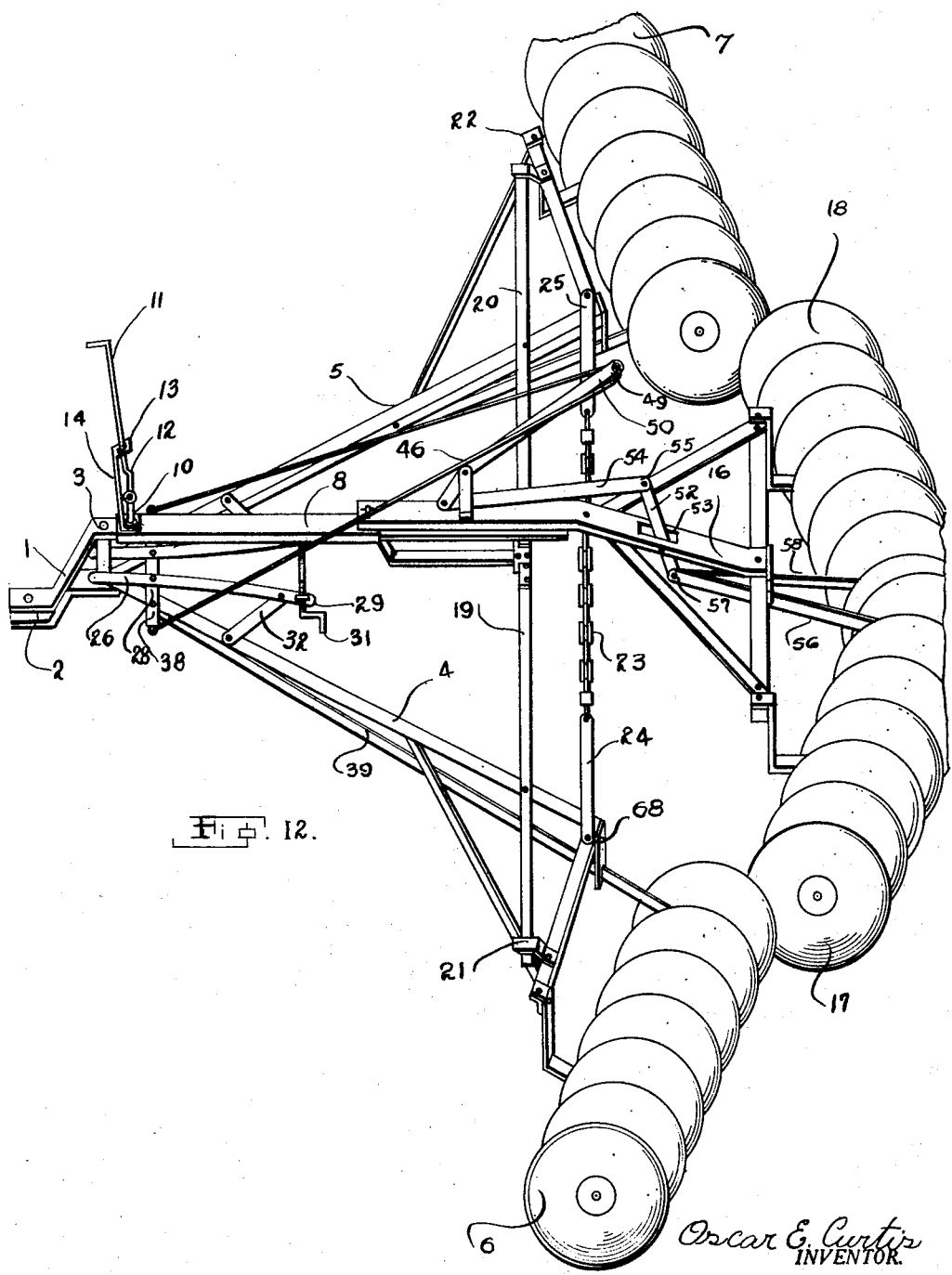
Fig. 12 is a perspective of my implement shown in a position as when in operation.

In my improved implement therefore, I shall show the novel structure as it operates with the old to accomplish my purposes wherein, a draw bar 1 with its yoke front 2 for its detachable connection with a tractor and the like has a king pin 3 for pivotally supporting side wing members 4 and 5 which respectively and pivotally engage disk gang members 6 and 7 or other soil agitating members.

Draw bar 1 also slidably and detachably engages a sleeve 8 anchored by a pin 9 held in operative position by a spring 10 and adapted to be lifted out of its engagement with the draw bar by a handle 11 having a hook portion 12 which engages a catch member 13 of upright bracket 14 when pin 9 is thus lifted out of an anchoring hole 15 of draw bar 1.

This sleeve 8 is defining a direct means of attachment for central rear frame portion 16 with draw bar 1, thus carries the pulling strain for the operation of the central agitator members 17 and 18 which are pivoted in their connection with frame part 16.

It will also be observed that when my implement is spread out to its operating position then the central portion 16 of this frame carries a pair of pivoted brace members 19 and 20 which swing out to brace the side wing members 4 and 5 of the frame in their spread position. These brace members 19 and 20 come to rest under stop brackets 21 and 22 respectively and in this position they serve as an effective means of holding the side wings and agitators in a relatively level operative position.

I have provided a flexible member 23 fixed in its connection with central section 16 of the frame and detachably secured at its respective ends 24 and 25 to these side wing members 4 and 5, in order to force central section 16 to operate in its proper place and not be moving from side to side. This flexible member 23 may be either a chain or other suitable hold member.

My present invention provides means for simultaneously adjusting all of these agitator units, which are pivotally mounted on the frame members and this adjustment can be made easily and conveniently before going into the field, if desired.

Thus, referring to the drawings for an explanation of the control device and its operative connection, I provide a pair of lever arms 26 and 27 pivoted to a cross bar or yoke 28 intermediate the respective ends thereof and the rear ends 29 and 30 of lever arms 26 and 27 are adjustably connected by a screw member 31. This screw member 31 in its function acts to vary the space between ends 29 and 30 of lever arms 26 and 27 while cross bar or plate 28 moves freely forward or back as adjustments are made in screw member 31.

A pair of brace plates 32 and 33 establish a pivotal connection between lever arms 26 and 27 and side wing members 4 and 5 respectively for an anchorage therewith. When screw 31 is adjusted, it is thus obvious that the resulting effect is to shift the location of cross bar 28 along the forward end of draw bar 1.

It will then be observed that a simple, practical and convenient adjustment may be made in the pivotal operating positions of each of the disk gangs merely by providing a substantial control rod establishing a control connection between cross bar 28 and the respective disk gangs; so that when an adjustment is made in the screw member 31 then each disk gang unit will shift in its pivotal position about its supporting joint 34, 35 and 36 and 37 respectively.

I achieve this novel and practical result in a way that does not require so many parts as did the former construction and with a greatly simplified arrangement of operating parts.

For instance, to one end 38 of cross bar 28, I secure a control rod 39 which pivotally engages the inner end 40 of axis 41 of disk gang 6; while control rod 42 establishes a pivotal connection for a like purpose between the other end 43 of cross bar 28 and the inner end 44 of axis 45 of disk gang 7. Thus, the disk gangs on the side wing members of the frame are in this way constructed to permit these gangs to be set to a pivotal position to cause them to cut the desired depth each, or a selected, depth cut, as this adjustment is commonly called; and after making this adjustment, it is not then necessary to re-set it from time to time while operating, unless it is desired to vary the cutting depth.

I have also provided a similar control for the pivotal adjustment of disk gangs 17 and 18, on the central rear section 16 of the frame, wherein a V control rod 46 has one end 47 pivotally engaging end 38 of cross bar 28 and the other end 48 likewise engaging the other end 43 of cross bar 28, while the central loop 49 of rod 46 operatively engages top end 50 of upright lever 51 on central portion 16 of the frame.

In order to secure the desired lever action for control of central rear disk gangs 17 and 18, I find it preferable to provide a sort of balanced rocker arm lever 52 pivotally supported in a slot 53 on frame section 16.

When rod 46 engaging both ends of bar 28 and the top end of lever 51 is adjusted by turning screw 31, then an intermediate rod 54 pivotally engaging end 55 of lever 52 moves lever 52 pivotally in slot 53 and effects an end-wise adjustment of V rods 56 and 58 which engage end 57 of lever 52 and pivotally engages inner end of axis 59 of disk gang 17 by one end 60 and inner end 61 of axis 62 of disk gang 18 by the other end 63 of these rods 56 and 58.

Thus, an adjustment may be made in the controls for the cutting depths of the disk gangs while the implement is in a contracted position, which depth cutting position will be assumed by the implement as it assumes an operating position with its side wings spread out and the central section of the frame and cutters forwardly adjusted; and if any such adjustment is needed after the work is started then any adjustment in control screw 31 will simultaneously then set all disk gangs to desired pivoted operating position for depth cuts.

It will be observed that I have provided an adjustable guide member 64 defining a guide yoke having a slotted hole 65 for a bolt and a bottom open slot 66 to slidably accommodate rod 56 in its movements and I have also provided a similar yoke member 67 to guide rod 58 at the same time. Guide yoke 68 likewise holds control rod 39 and guide yoke 69 holds control rod 42.

These yoke members serve to stabilize the control rods in holding the disk gang members in their desired operating position.

It will be noted that the lever arms 26 and 27 in their fitting position on cross bar 28 are operatively pivoted to this bar in their spaced relations so that when these arms extend forward of bar 28 on each side of king pin sleeve 3, then the king pin sleeve 3 will have a tendency to hold these lever arms in center alignment in the manner of a compass construction with the result that cross bar 28 will not be slipping from side to side out of center when adjustments are being made and when the implement is in operation in the field. Thus, the forward ends of lever arms 26 and 27 will be held from moving sidewise by king pin sleeve 3.

Having thus described the nature of my invention, what I claim is:

1. A disk harrow comprising a frame having a front draw bar, a central rear section and pivoted disk gangs supported thereby and a slidable sleeve having means for its detachable engagement with said draw bar and establishing adjustable connection between the draw bar and said central rear section, a pair of lateral wing members of the frame pivoted to the forward end of the draw bar with a disk gang member pivoted to each for its support; means for selectively adjusting the pivotal operative position of said disk gangs and control rods establishing connection between said disk gangs and said pivotal adjusting means therefor, means for bracing said lateral wing members of the frame in their operative position, means for urging a central alignment of said central rear section and disk gangs, and means for urging a horizontal stability for said disk gang units in their pivotal operative position.

2. In a disk harrow having a frame, a front draw bar, a central rear section and pivoted disk gangs supported thereby and a slidable sleeve having means for its detachable engagement with said draw bar and establishing adjustable connection between the draw bar and the central rear section, a pair of lateral wing members of the frame pivoted to the forward end of the draw bar with a disk gang member pivoted to each for its support; means for selectively adjusting the pivotal operative position of said disk gangs and control rods establishing connection between said disk gangs and said pivotal adjusting means therefor, means for bracing said lateral wing members of the frame in their operative position, and for limiting the outward spread of said lateral wing members and means for urging a horizontal stability for said disk gangs in their pivotal operative position.

3. A soil agitating implement comprising a frame, shaped to define a front draw bar, side wings pivoted to the forward part of the draw bar and a central rear section slidably and detachably adjustable longitudinally in its operative connection with said draw bar; soil agitators adjustably secured to said pivoted wing of the frame and to said central rear section of the frame; said frame operatively disposed in a generally fan shape when in use, said rear central section operable to drop back in its slidable engagement with said draw bar when released from a forward engagement therewith and said side wings operable to pivotally fold in alongside said draw bar ahead of said central section thereof when the frame is contracted to pass through a fence opening and the like, screw adjustment control levers provided for preliminary selective settings in the pivotal positions of said agitating members to make them effectively automatic in their operative depth cutting adjustments, when the implement is functioning as a soil agitator.

4. An automatically controlled disk harrow comprising a frame, having side wing sections and a rear central section, a forward draw bar pivotally engaging the forward end of said side wings and slidably and detachably engaging said rear central section; soil agitating disk gang members adjustably secured to said side wings and to said rear central section; said implement disposed in a generally fan shape when in operation in the field and operable to slidably drop said central section's attachment back on said draw bar and to simultaneously and pivotally contract said side wing sections in alongside of said draw bar ahead of said central rear section when the implement is adjusted to move through a fence opening and the like, screw adjustment control levers provided for preliminary selective settings in the pivotal positions of said disk gang members to make them effectively automatic in their operative depth cutting adjustments when the implement is functioning as a soil agitator.

5. As a new article of manufacture, a soil agitating implement of the disk harrow type, comprising a frame, shaped to define a front draw bar, side wings pivoted to the forward portion of the draw bar and a central rear section of the frame slidably and detachably adjustable longitudinally in its operative connection with said draw bar; soil agitator disk gangs adjustably secured to said pivoted wings of the frame and to said central rear section thereof; said frame assuming a fan shape, when in operation, and operable to drop said central section's attachment back on said draw bar and to simultaneously and pivotally contract said side wing sections in alongside of said draw bar when the implement is adjusted to be moved through a fence opening and the like; an automatic control mechanism for selectively adjusting the depth cutting position of said disk gang agitators, the structural parts of which mechanism are co-operating to define lever arms, brace arms, a screw adjusting member and an adjustable support for said parts, control rods, establishing connections between said mechanism and the disk gangs out on said pivoted side wings of the frame, further control rods establishing a control connection between said control mechanism and the disk gangs back on said rear central section of the frame through lever members operatively supported on the frame; means for holding said side wing sections substantially in out-spread operating position and means for holding said central section in central operative alignment when in operation.

6. In a disk harrow, a frame, having a draw bar, a central support for a disk gang and slidably adjustable in its support on said draw bar and a pair of lateral disk gangs and supporting frame members respectively disposed on opposite sides of the draw bar and pivoted thereto adjacent the forward end thereof; a means for automatically controlling the respective selected pivotal operating positions of said disk gangs comprising a yoke disposed across the draw bar, a pair of adjustment levers connected by a screw adjustment in their space relation at their free ends and pivotally connected at their opposite ends to said yoke, hinge arms establishing pivotal connection between said adjustment levers and the support for said lateral disk gangs, control rods connecting said yoke ends with said disk gangs for the depth cutting pivotal adjustment of the gangs, sleeve means operatively and slidably adjustable on said draw bar; for holding said central support for a disk gang into normal operative positions, pivoted brace members, establishing connection between said central support for a disk gang and said lateral gang supports, in their operative position, means for holding said pivotal brace members rigidly when in operative position, means for urging the horizontal stability of said pivotal disk gangs and a chain connection secured to said central support for a disk gang and at opposite ends to said lateral disk gangs for holding said central support into center alignment when in operation; means for holding said sleeve connecting said central disk gang support and disk gang in their forward and operating position with respect to said draw bar, means for optionally releasing said sleeve holding means and means for detachably securing said sleeve in its retracted position on said draw bar.

7. A disk harrow comprising a frame shaped to define a draw bar, a central rearward disk gang support, a pair of opposite lateral wing members pivoted to said draw bar and a slidably adjustable sleeve provided with means for its detachable engagement to said draw bar in predetermined slidable positions and said sleeve establishing connection between said central rearward disk gang support and said draw bar, disk gang members pivotally secured to said central rearward disk gang support and a disk gang pivotally secured to each of said wing members of the frame, means for automatically controlling the pivotal operating position of said disk gangs and means for adjusting said controlling means; said controlling means comprising a yoke disposed across the forward end of said draw bar, a pair of adjustment levers connected by a screw adjustment in their space relation at their free ends and pivotally connected at their opposite ends to said yoke, hinge arms establishing pivotal connection between said adjustment levers and said lateral wings on the draw bar, control rods connecting said yoke ends with said disk gangs for the depth cutting adjustment of the gangs and pivoted brace members establishing connection between said sleeve and said lateral wing members of the frame and bracing the same when in operating position, means for holding said pivoted brace members when in operative position to brace said wing member of the frame, means for urging the horizontal stability of said pivoted disk gangs and a chain establishing connection between said opposite wing members and said central rear portion of the frame.

8. In a disk harrow having a frame shaped to define a draw bar, a central rearward disk gang support, a pair of opposite lateral wing members pivoted to said draw bar, a slidable adjustable sleeve provided with means for its detachable engagement of said draw bar in predetermined slidable positions and said sleeve establishing connection between said central rearward disk gang support and said draw bar, disc gang members pivotally secured to said rearward support and to each of said lateral wing members thereof; a screw adjustment and control members connected therewith and comprising a yoke disposed across said draw bar, a pair of adjustment levers pivoted intermediate the ends of said yoke respectively intermediate their ends and adjustably connected at their free ends by a threaded screw member, hinge arms establishing pivotal connection between said adjustment levers and said lateral wing members of the frame, said yoke disposed transversely across the draw bar and longitudinally slidable under the same, a pair of control rods each respectively connected by one end to opposite ends of said yoke and connected by the other end adjacent the inner end of said disk gang operatively pivoted on said wing members of the frame and other control rods respectively establishing control connection between the respective ends of said yoke and the adjacent ends of said disk gang members operatively pivoted to said rear central frame rearward of said slidable adjustable sleeve; said control members connected from said yoke to said disk gang members and adapted to provide through said yoke, said adjustment levers, said hinge arms and said threaded screw member, means by which said disk gangs may be simultaneously adjusted in their pivoted depth cutting operative position and adjustment brackets on said frame each respectively contacting said control rods to operatively urge the horizontal stability of said disk gang units individually when the disk harrow is in use.

9. A disking implement comprising a forward pull member and a rear pull member, adjustable in its lengthwise connection therewith and means for holding said rear pull member where it is adjusted, side arms operatively connected with the forward pull member for a lateral adjustment, soil agitating members operatively connected with the forward pull member for a lateral adjustment, soil agitating members operatively supported on said laterally adjustable arms and on said rear pull member and pivotally adjustable on each; said holding means engaging said rear pull member in its forward lengthwise adjustment when operating, said side arms laterally extended when operating, brace members for holding the side arms in extended position, manual means for selectively adjusting the operating position for said disk gangs, control rods for executing said adjustments, intermediate adjusting means establishing connection between said manual adjusting means and said control rods and operable to automatically adjust the relative pivotal position of said disk gangs through said control rods for contracting or expanding the disking implement, said side arms contractable and said rear pull member simultaneously and relatively extendable when said holding means is released and when pulling power is then applied to said forward pull member, and said side arms adapted to be again laterally extended and the rear pull member again simultaneously adjustable to a relatively retracted lengthwise position when power is rearwardly applied to said forward pull member.

10. A disking implement comprising a forward pull member and a rear pull member, adjustable in its lengthwise connection therewith and means for holding said rear pull member where it is adjusted, side arms operatively connected with the forward pull member for a lateral adjustment, soil agitating members operatively supported on said laterally adjustable arms and on said rear pull member and pivotally adjustable on each; said holding means engaging said rear pull member in its forward lengthwise adjustment when operating, said side arms laterally extended when operating, brace members for holding the side arms in extended position, manual means for selectively adjusting the operating position for said disk gangs, control rods for executing said adjustments, intermediate adjusting means establishing connection between said manual adjusting means and said control rods and operable to automatically adjust the relative pivotal position of said disk gangs through said control rods for contracting or expanding the disking implement said side arms contractable and said rear pull member simultaneously and relatively extendable when said holding means is released and when pulling power is then applied to said forward pull member, and said side arms adapted to be again laterally extended and the rear pull member again simultaneously adjustable to a relatively retracted lengthwise position when power is rearwardly applied to said forward pull member.

11. A soil agitating implement comprising a front draw bar and a rear draw bar slidably connected thereto by detachable holding means, side arms having outer disk gangs pivoted thereto and pivoted brace members for holding said side arms in spread position for operating, said side arms pivotally connected to the front draw bar, a rear disk gang carried by said rear draw bar; said soil agitating implement contractable from its operative spread position when said front draw bar is released from said detachable holding means and when pulling power then is applied to said front draw bar, and manual means for selectively adjusting the operating position for said disk gangs, control rods for executing said adjustments intermediate adjusting means establishing connection between said manual adjusting means and said control rods and operable to automatically adjust the relative pivotal position of said disk gangs through said control rods for contracting or expanding the disking implement.

12. A soil agitating implement comprising a front draw bar and a rear draw bar slidably connected thereto by a detachable holding means therefor, side arms having outer disk gangs pivoted thereto and pivoted brace members for holding said arms in spread position for operating said side arms pivotally connected to the front draw bar, a rear disk gang carried by said rear draw bar and said soil agitating implement operable to spread from a contracted position when a rearward push is applied to said front draw bar and manual means for selectively adjusting the operating position for said disk gangs, control rods for executing said adjustments, intermediate adjusting means establishing connection between said manual adjusting means and said control rods and operable to automatically adjust the relative pivotal position of said disk gangs through said control rods for contracting or expanding the disking implement.

13. A soil agitating implement comprising a forward draw bar with pivotal attached right and left side arms having pivotal and adjustable attached disk gangs, said rear draw bar pivotally attached to a holding member operatively connected to the forward draw bar, and having pivotal attached holding arms pivotally connected to said right and left side arms which are adapted to contract from an expanded position when said holding member is disengaged and pulling power is applied to the forward draw bar and manual means for selectively adjusting the operating position for said disk gangs, control rods for executing said adjustments, intermediate adjusting means establishing connection between said manual adjusting means and said control rods and operable to automatically adjust the relative pivotal position of said disk gangs through said control rods for contracting or expanding the disking implement.

14. A soil agitating implement comprising a forward draw bar with pivotal attached right and left side arms having pivotal and adjustable attached disk gangs, a rearward draw bar having pivotal and adjustable attached disk gangs; said rear draw bar pivotally attached to a holding member operatively connected to the forward draw bar and having pivotal attached holding arms pivotally connected to said right and left side arms which are adapted to expand from a contracted position when said holding member is disengaged and reverse power is applied to said forward draw bar and manual means for selectively adjusting the operating position for said disk gangs control rods for executing said adjustments, intermediate adjusting means establishing connection between said manual adjusting means and said control rods and operable to automatically adjust the relative pivotal position of said disk gangs through said control rods for contracting or expanding the disking implement.

OSCAR E. CURTIS.